US006909989B2

(12) United States Patent
Thompson et al.

(10) Patent No.: US 6,909,989 B2
(45) Date of Patent: Jun. 21, 2005

(54) METHOD AND SYSTEM FOR ESTABLISHING OPERATIONAL STABILITY PRIOR TO DETERMINING TEMPERATURE CORRECTION FACTORS FOR A GENERATOR

(75) Inventors: Edward David Thompson, Casselberry, FL (US); Ethan D. Frolich, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 101 days.

(21) Appl. No.: 10/373,618

(22) Filed: Feb. 24, 2003

(65) Prior Publication Data

US 2004/0167746 A1 Aug. 26, 2004

(51) Int. Cl.[7] ................................................ G06F 11/30
(52) U.S. Cl. ........................ 702/182; 702/57; 324/772; 73/660
(58) Field of Search .................... 702/182, 57; 324/772; 73/660

(56) References Cited

U.S. PATENT DOCUMENTS

| | | | | |
|---|---|---|---|---|
| 4,280,060 A | * | 7/1981 | Kure-Jensen et al. ..... | 290/40 R |
| 4,602,872 A | | 7/1986 | Emery et al. | |
| 4,698,756 A | | 10/1987 | Gonzalez et al. | |
| 4,891,948 A | * | 1/1990 | Kure-Jensen et al. ......... | 60/645 |
| 5,294,879 A | * | 3/1994 | Freeman et al. .............. | 322/23 |
| 5,581,470 A | * | 12/1996 | Pawloski ...................... | 702/61 |
| 5,684,718 A | * | 11/1997 | Jenkins et al. ................ | 702/57 |
| 5,701,044 A | | 12/1997 | Emshoff et al. | |
| 5,754,033 A | * | 5/1998 | Thomson ...................... | 322/45 |

FOREIGN PATENT DOCUMENTS

WO    WO 9607958 A1 * 3/1996   ......... G05B/19/418

OTHER PUBLICATIONS

Generac Power Systems, INC., *Power Manager*, 2 pages, Waukesha, WI, (www.generac.com/industrial/products/remoteMonitor.asp).

Ed Thompson, *Draft of Monticello GenAID upgrade proposal*, Txu Mo GenAID Upgrade, Feb. 12, 2002, 2 pages.

* cited by examiner

*Primary Examiner*—Kamini Shah
*Assistant Examiner*—Anthony T. Dougherty

(57) ABSTRACT

Computer-based method and system are provided for establishing operational stability prior to determining temperature correction factors for a generator. The method allows providing (e.g., 102) a data file including data indicative of prescribed stability criteria for the generator. The method further allows monitoring (e.g., 104) respective operational parameters indicative of actual operational stability of the generator. The respective operational parameters indicative of the actual operational stability of the generator are related (e.g., 106) to the prescribed stability criteria in the data file. In response to the relating action, a graphical display (e.g., 82) is generated (e.g., 108) and the graphical display is indicative of whether or not the actual operational stability of the generator complies with the prescribed stability criteria.

5 Claims, 3 Drawing Sheets

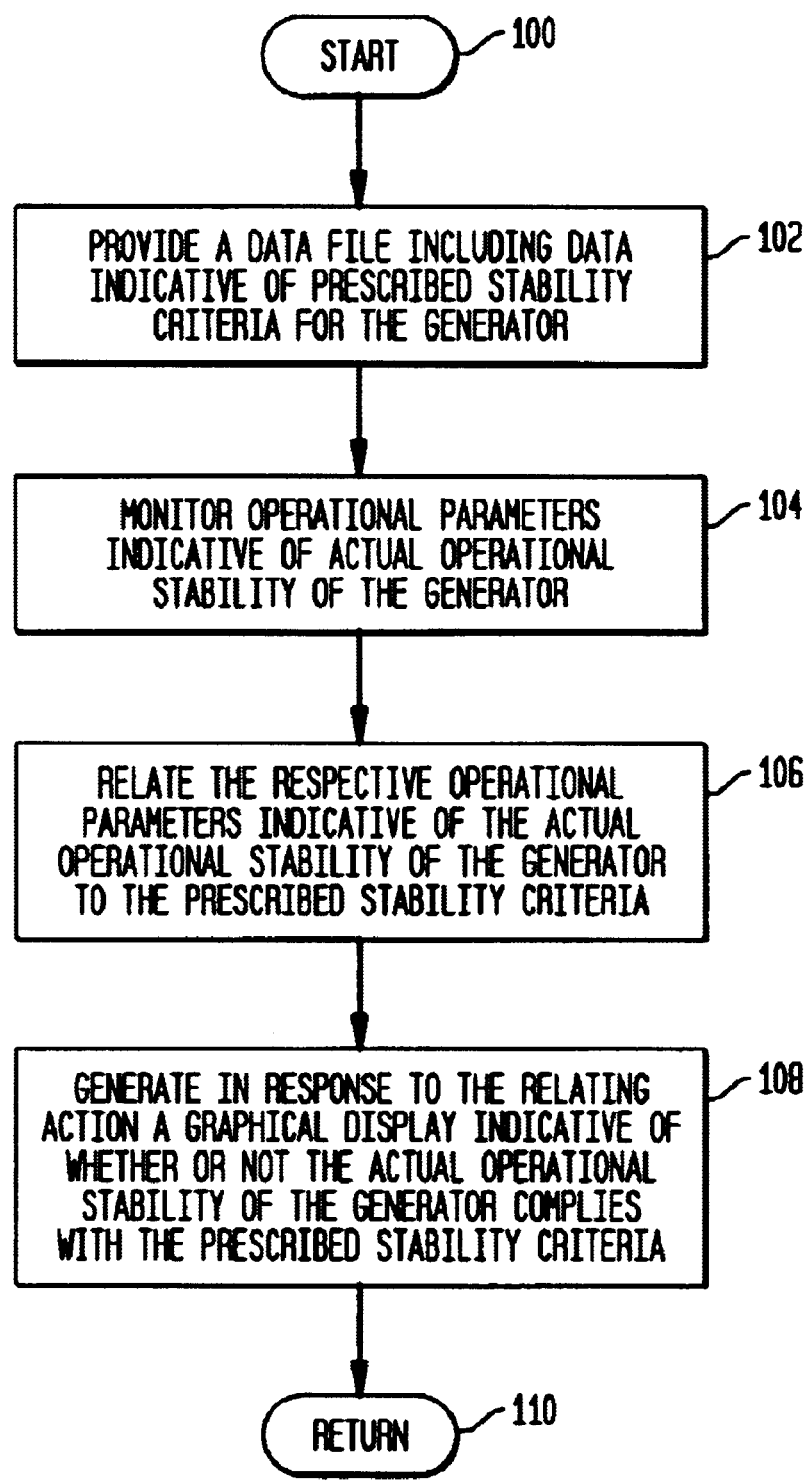

METHOD AND SYSTEM FOR ESTABLISHING OPERATIONAL STABILITY PRIOR TO DETERMINING TEMPERATURE CORRECTION FACTORS FOR A GENERATOR

FIELD OF THE INVENTION

The present invention relates in general to electrical generators, and, more particularly, to a method and system for confirming the existence of a stable and accurate baseline of conditions prior to determining temperature correction factors for the generator.

BACKGROUND OF THE INVENTION

In electric generators, such as those driven by gas or steam turbines, a tremendous amount of heat may be produced during normal operation. Some generators may weigh hundreds of tons and the unchecked production of heat in such machines as may be caused by mechanical and electrical losses (e.g., $I^2R$ losses) may lead to a generator failure. Accordingly, heat dissipation requirements for a generator may be accomplished with a cooling system that utilizes a flow of cooling fluid within the generator housing as well as within the rotor and stator structures to remove the produced heat.

A suite of temperature sensors is provided for the continuous monitoring of the cooling medium and/or generator structures to protect the generator against malfunctions. A rise in temperature may be indicative of malfunctions, such as a damaged winding or reduction in the flow of the cooling fluid due to a partial blockage of a cooling path. U.S. Pat. No. 4,602,872, assigned to the predecessor of the present assignee and herein incorporated by reference, discloses a technique that allows combining the outputs of multiple temperature sensors to obtain an average temperature reading during an initialization process. Each sensor reading is subtracted from the average temperature to derive a correction factor for that particular sensor, for that particular average.

To achieve accurate temperature calibration for any given generator and to avoid erroneous indications, the temperature correction factors should be determined upon achieving stable operational conditions at each of various generator load levels. Written instructions specifying applicable stability criteria for any given generator may be provided to assist the operator to determine whether the generator has reached a sufficient level of stability. In practice, however, it is up to each operator whether to manually verify or simply decide, based on their experience and judgment, when the process for determining the temperature correction factors should be initiated. That is, under present techniques, the initialization process for determining the temperature correction factors may suffer due to the subjectivity and variability that will inevitably occur from one operator to another operator, or even for the same operator over an extended period of time. In addition, a manual verification of operational stability of the generator may require burdensome and time-consuming checks. This is valuable time the operator could put to better use for ensuring smooth and proactive management of the power plant equipment under the responsibility of the operator.

BRIEF SUMMARY OF THE INVENTION

The inventor of the present invention has recognized a computerized and user-friendly solution that at relatively low cost allows systematically guiding the operator to establish a stable and accurate baseline prior to determining the temperature correction factors for the generator.

Generally, the present invention fulfills the foregoing needs by providing in one aspect thereof, a computer-based method for establishing operational stability prior to determining temperature correction factors for a generator. The method allows providing a data file including data indicative of prescribed stability criteria for the generator. The method further allows monitoring respective operational parameters indicative of actual operational stability of the generator. The respective operational parameters indicative of the actual operational stability of the generator are related to the prescribed stability criteria in the data file. In response to the relating action, a graphical display is generated and the graphical display is indicative of whether or not the actual operational stability of the generator complies with the prescribed stability criteria.

In another aspect thereof, the present invention further fulfills the foregoing needs by providing a computerized system for guiding an operator to establish operational stability prior to determining temperature correction factors for a generator. The system comprises a data file including data indicative of prescribed stability criteria for the generator. The system further comprises a guiding wizard for eliciting information regarding a respective generator load level for establishing the operational stability and for providing guidance to determine compliance with the prescribed stability criteria prior to determining the temperature correction factors. An input/output device is provided for interfacing with the guiding wizard and selecting the generator load level. A processor is configured to monitor respective operational parameters indicative of actual operational stability of the generator. The processor is further configured to access the data file for relating the respective operational parameters indicative of the actual operational stability of the generator to the prescribed stability criteria in the data file and generate a graphical display indicative of whether or not the actual operational stability of the generator complies with the prescribed stability criteria.

BRIEF DESCRIPTION OF THE DRAWINGS

The features and advantages of the present invention will become apparent from the following detailed description of the invention when read with the accompanying drawings in which:

FIG. 5 is a flow chart of a computer-based method for establishing operational stability prior to determining temperature correction factors for a generator.

DETAILED DESCRIPTION OF THE INVENTION

Figure 1:
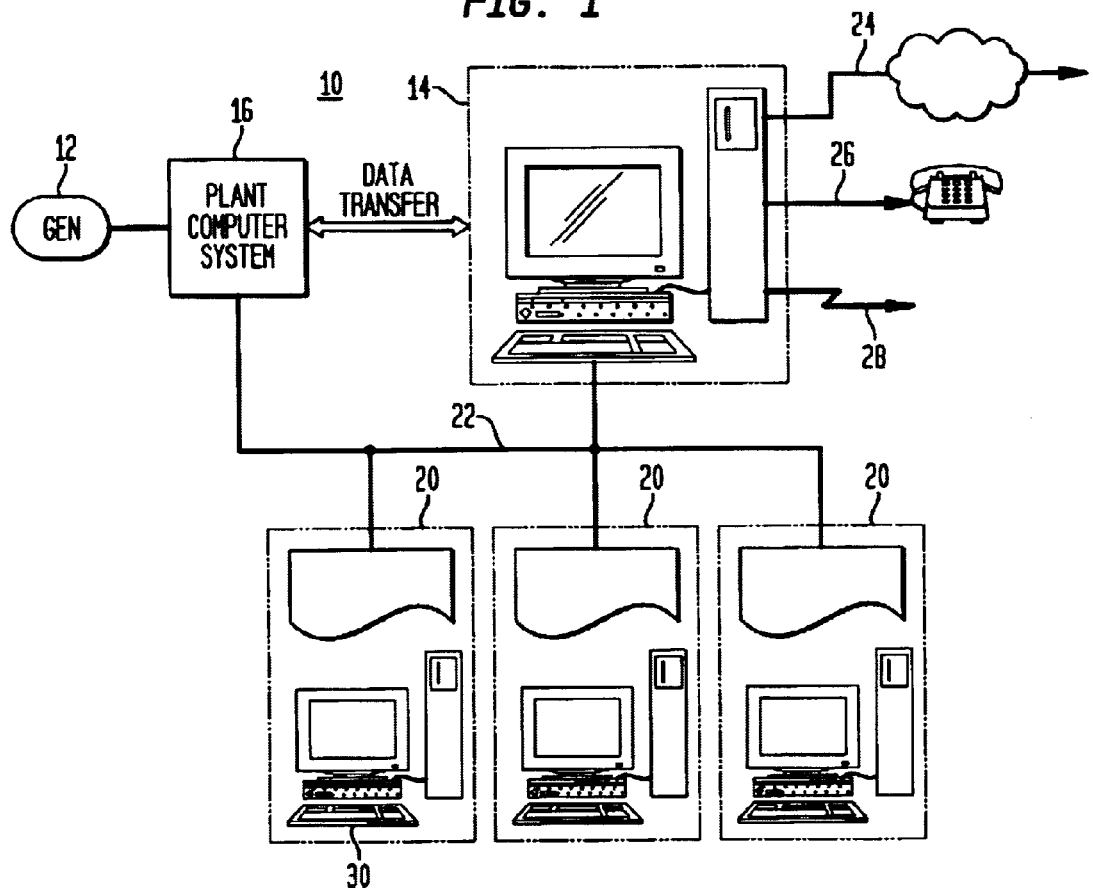
FIG. 1 shows an exemplary data communications system that may be used for communicating information to users regarding the operation of a generator.

FIG. 1 represents an exemplary data communications system 10 that may be used for communicating information to users at a power generation plant, such as operators, service personnel, and engineering staff, regarding the operation of power plant equipment, such as a generator 12. More specifically, in accordance with aspects of the present invention, system 10 may be configured for systematically and accurately guiding an operator to establish operational stability prior to determining temperature correction factors for the generator. A server 14 may be connected to a plant computer system 16 to communicate and/or process data indicative of operational conditions of the generator. Server 14 may be connected to a plurality of computerized user stations 20 via a suitable communications network, such as a local area network (LAN) 22, internet connection 24, modem connection 26, wireless connection 28, etc. In one exemplary embodiment, the user station may comprise a personal computer, laptop computer, Unix workstation, or any other device able to communicate via a communications network.

Figure 3:
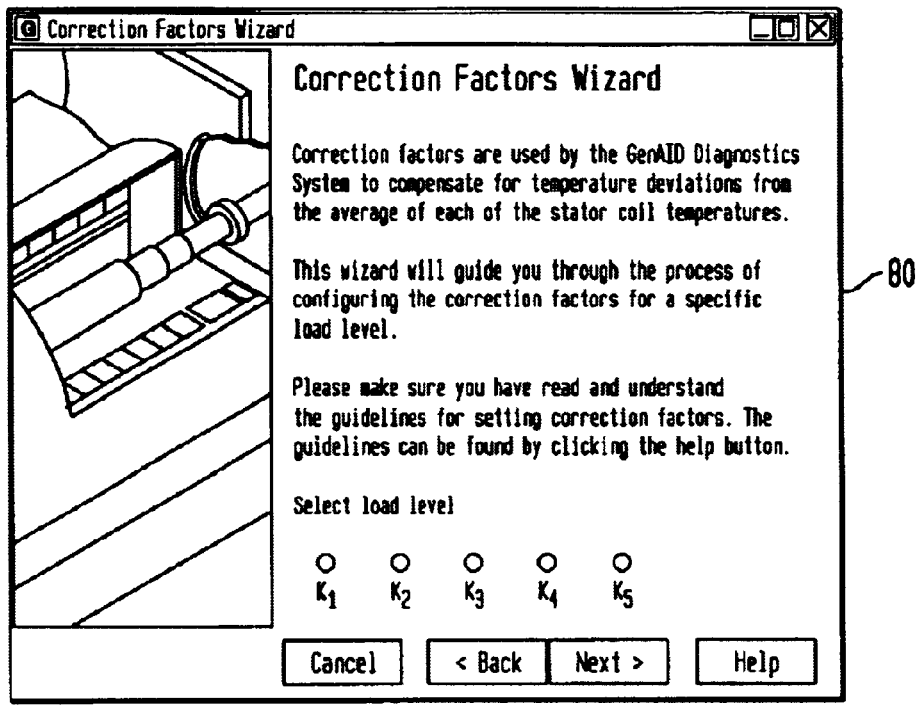
FIG. 3 illustrates an exemplary screen of a guiding wizard configured to provide guidance to an operator to determine compliance with prescribed stability criteria prior to determining the temperature correction factors at the selected load.

As shown in FIG. 3, a guiding wizard 80 is configured to elicit information regarding a respective generator load level for establishing the operational stability of the generator. The operator may click on any of the buttons or icons labeled K1 through K5 for selecting the respective generator load level. For example, the button with the label K1 may be used for selecting a relatively low level of load (e.g., 20% of rated load) for the generator, while the button with the label K5 may be used for selecting a high level load (e.g., 100% of rated load) for the generator. In this example, buttons K2–K4 may be used for selecting various intermediate levels of load for the generator, such as 40%, 60% and 80% of rated load, respectively. In one exemplary embodiment, the guiding wizard may automatically select the numerical values to use for each of the respective generator load levels. Guiding wizard 80 is further configured to provide guidance to determine compliance with the prescribed stability criteria prior to determining the temperature correction factors at the selected load.

Figure 2:
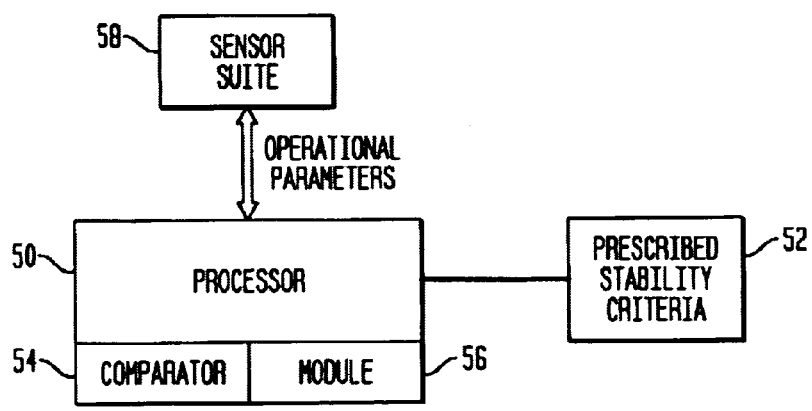
FIG. 2 illustrates an exemplary processor that may be used for processing data used for establishing operational stability prior to determining temperature correction factors of the generator.
Figure 4:
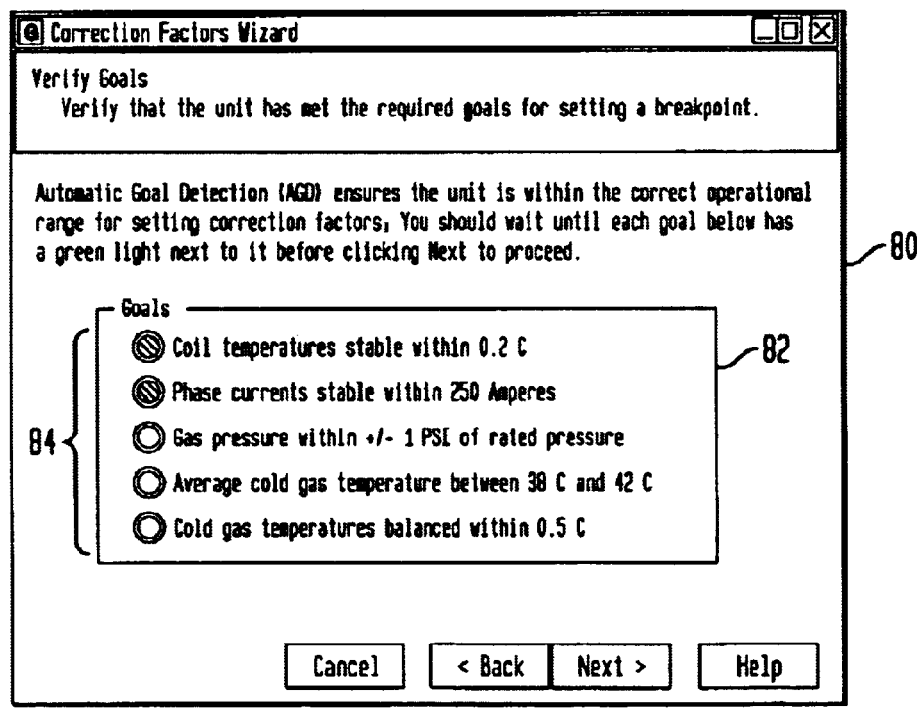
FIG. 4 illustrates an exemplary graphical display indicative of whether or not the actual operational stability of the generator complies with the prescribed stability criteria.

As shown in FIG. 2, an input/output device 30, such as may be part of each user station 20, is provided for interfacing with the guiding wizard and selecting the generator load level. Examples of the input/output device may include a keyboard, computer mouse, pointer, etc. As further shown in FIG. 2, server 14 comprises a processor 50 coupled to a data file 52 including data indicative of prescribed stability criteria for the generator. As used herein the expression "data file" may comprise a database, plain text file, text file with markup text, (e.g., XML, HTML, SGML, etc.) binary file, or any other type of file readable by a computer. Some examples of data indicative of the prescribed stability criteria are illustrated within a screen 82 seen in FIG. 4. It will be appreciated that the present invention in no way should be limited to the exemplary stability criteria shown in screen 82 since such criteria may vary depending on the specific type of generator undergoing the process for determining the temperature correction factors.

Processor 50 is configured to monitor operational parameters indicative of actual operational stability of the generator. Examples of operational parameters that may be monitored by processor 50 may comprise stator windings temperature, phase currents and pressure and temperature of the cooling fluid. In one exemplary embodiment, respective signals indicative of the operational parameters are available from a suite of sensors 58 whose signal readings are communicated to the plant computer system and in turn to server 14.

Processor 50 is further configured to access the data file 52 for relating the respective operational parameters indicative of the actual operational stability of the generator to the prescribed stability criteria in the data file. By way of example, a comparator 54 may be programmed to perform the relating action. Processor 50 includes a module 56 programmed to generate a graphical display 84 indicative of whether or not the actual operational stability of the generator complies with the prescribed stability criteria. In one exemplary embodiment, the graphical display is configured to provide an indication of compliance or lack thereof relative to each of the individual prescribed stability criteria. In another embodiment, the graphical display is configured to provide a single indication of compliance and/or non-compliance with all of the prescribed stability criteria. For example, the indication may take the form of a green circle for showing a favorable indication relative to compliance of the prescribed stability criteria. Conversely, the indication may take the form of a red circle for showing an unfavorable indication relative to compliance of the prescribed stability criteria. In one exemplary embodiment, the indication may take the form of a yellow circle for showing marginally acceptable compliance of the prescribed stability criteria. It will be appreciated that each of the foregoing indications may take a variety of forms and is not limited to the given examples. Upon making a determination of the temperature correction factors at the selected generator load level, the wizard may be configured to elicit information for selecting another generator load level for establishing operational stability prior to determining the temperature correction factors at that other load level.

FIG. 5 is a flow chart of a computer-based method for establishing operational stability prior to determining temperature correction factors for a generator. Subsequent to start block 100, block 102 allows providing a data file comprising data indicative of prescribed stability criteria for the generator. Block 104 allows monitoring respective operational parameters indicative of actual operational stability of the generator. Block 106 allows relating the respective operational parameters indicative of the actual operational stability of the generator to the prescribed stability criteria in the data file. Prior to return block 110, block 108 allows generating in response to the relating action a graphical display indicative of whether or not the actual operational stability of the generator complies with the prescribed stability criteria.

Once the graphical display provides a favorable indication relative to compliance of the prescribed stability criteria, the operator may proceed with the process for determining the temperature correction factors. In one exemplary embodiment, the graphical display is configured to identify a cause of an unfavorable indication relative to lack of compliance of the prescribed stability criteria. In this case, the operator may proceed to perform an action for correcting the cause of the unfavorable indication, such as boosting the pressure of the cooling fluid. A new iteration of the actions set forth in blocks 104 through 108 may be performed for determining whether the cause of the unfavorable indication has been corrected. The guiding wizard is a tool flexibly designed to avoid usurping the experience and judgment of the operator. That is, the wizard may be configured to allow the operator to override suggestions provided through the graphical display. For example, there may be practical situations where the operator, after exercising his judgment and discretion, may choose to proceed with the process for determining the temperature correction factors, even in the absence of favorable indication relative to full compliance of the prescribed stability criteria.

In one exemplary embodiment, prior to performing the actions set forth in blocks 104 through 108, the operator may select a respective generator load level at which the stability and determining the temperature correction factors for the selected generator load level, the operator may be guided to perform a new iteration of the actions set forth in blocks 104 through 108 for another load level so that temperature corrections factors may be determined over typical load levels expected to be encountered by the generator during normal operation.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. A computerized system for guiding an operator to establish operational stability prior to determining temperature correction factors for a generator, the system comprising:

a data file comprising data indicative of prescribed stability criteria for the generator;

a guiding wizard for eliciting information regarding a respective generator load level for establishing the operational stability and for providing guidance to determine compliance with the prescribed stability criteria prior to determining the temperature correction factors;

an input/output device for interfacing with the guiding wizard and selecting the generator load level; and a processor configured to monitor respective operational parameters indicative of actual operational stability of the generator, the processor further configured to access the data file for relating the respective operational parameters indicative of the actual operational stability of the generator to the prescribed stability criteria in the data file and to generate a graphical display indicative of whether or not the actual operational stability of the generator complies with the prescribed stability criteria.

2. The system of claim 1 wherein the input/output device is configured to communicate with the processor to show the graphical display.

3. The system of claim 1 wherein the graphical display is configured to provide an indication of compliance or lack thereof relative to the prescribed stability criteria.

4. The system of claim 3 wherein the graphical display is configured to identify a cause for lack of compliance relative to the prescribed stability criteria.

5. The system of claim 3 wherein the guiding wizard is configured, upon determination of the temperature correction factors at the selected generator load level, to elicit information for selecting at least another generator load level for establishing operational stability and determining temperature correction factors at said another load level.

* * * * *